Figure 1:
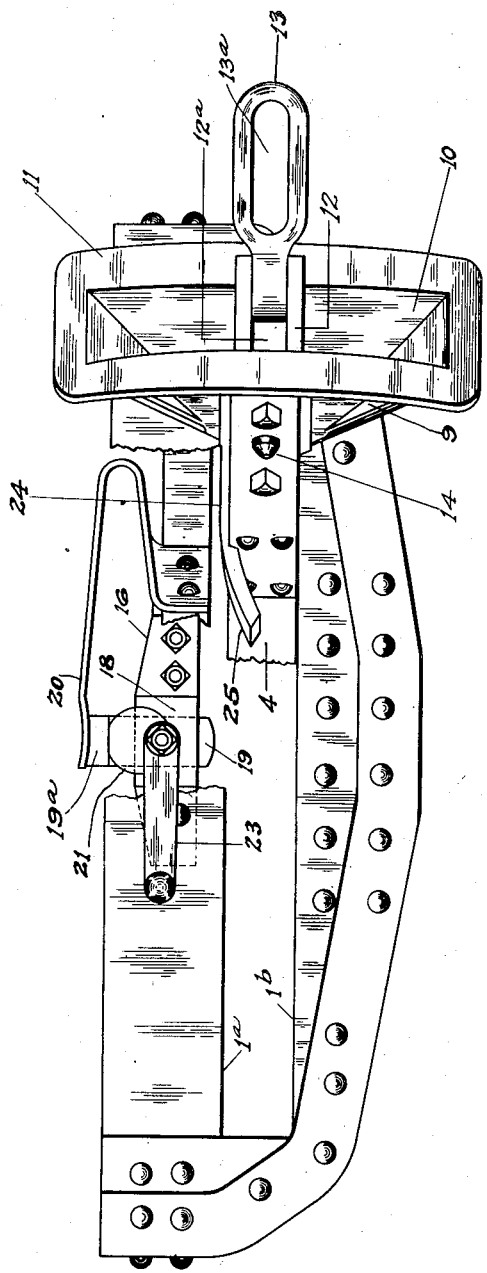

J. F. ECCARD & J. SMITH.
REVERSIBLE TRUCK.
APPLICATION FILED NOV. 14, 1913.

1,117,816.

Patented Nov. 17, 1914.
2 SHEETS—SHEET 1.

Witnesses
Effa M. Smith

Inventors
John F. Eccard
and Jacob Smith
By Staley Bowman
Attorneys

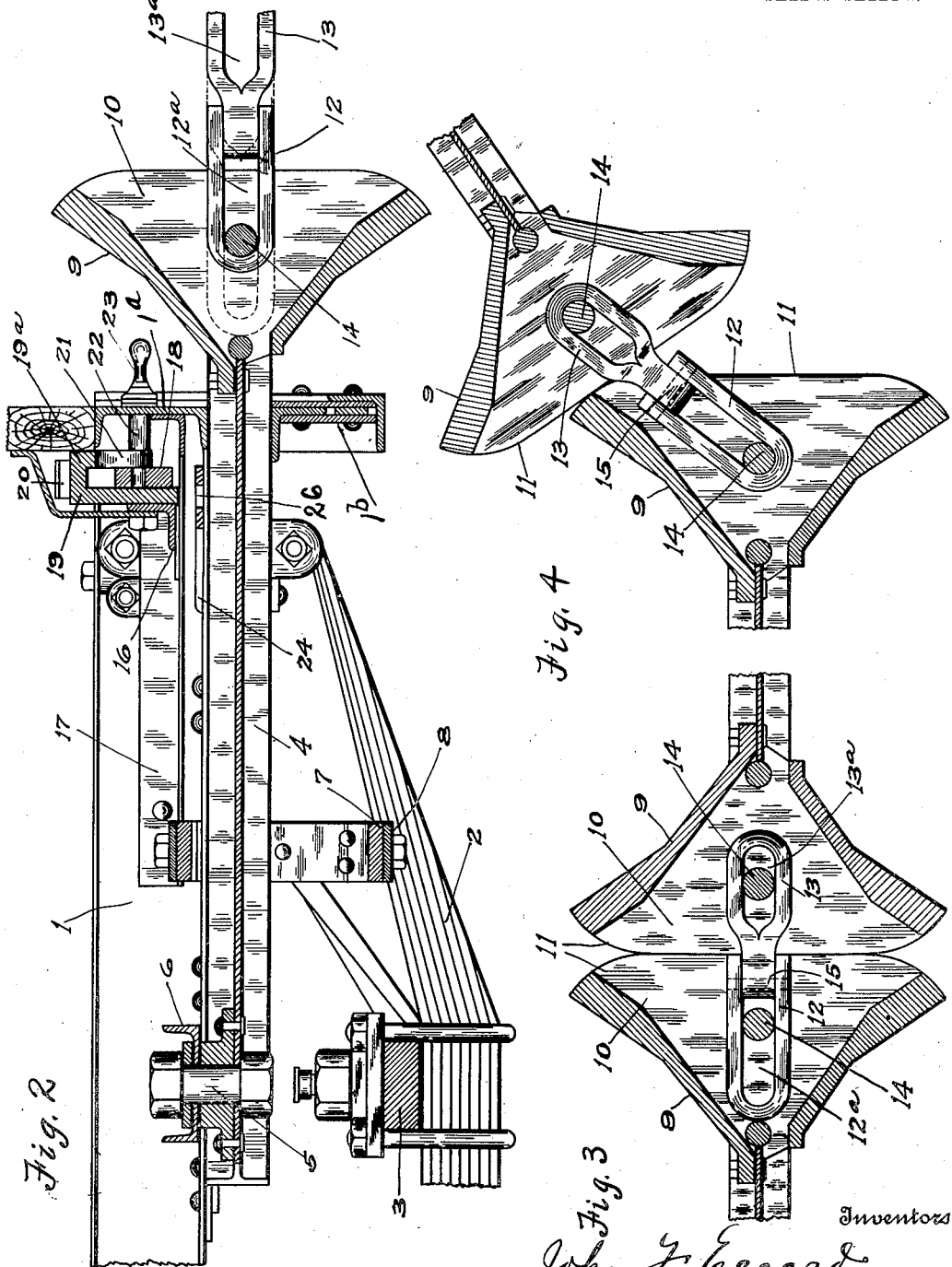

UNITED STATES PATENT OFFICE.

JOHN F. ECCARD AND JACOB SMITH, OF TROY, OHIO, ASSIGNORS TO THE TROY WAGON WORKS COMPANY, OF TROY, OHIO, A CORPORATION OF OHIO.

REVERSIBLE TRUCK.

1,117,816. Specification of Letters Patent. Patented Nov. 17, 1914.

Application filed November 14, 1913. Serial No. 800,950.

*To all whom it may concern:*

Be it known that we, JOHN F. ECCARD and JACOB SMITH, citizens of the United States, residing at Troy, in the county of Miami and State of Ohio, have invented certain new and useful Improvements in Reversible Trucks, of which the following is a specification.

This invention relates to improvements in reversible trucks or dump wagons of the type which employ a pivoted draft-bar at each end thereof, which draft-bar is connected to the wheels for steering purposes and also may be locked to the wagon bed or frame in a central position when the truck is being drawn from the opposite end, this application being a continuation of our pending application Ser. No. 739,860, filed January 2, 1913.

It is usual in the use of vehicles of the character referred to to couple them up in trains, the couplings being of such a character as will permit a laterally-swinging and up-and-down movement of the vehicles with respect to each other.

It is also desirable at times to back these trains of vehicles, which operation, due to the flexible character of the couplings, is a difficult one, as the flexible couplings have a tendency to buckle sidewise.

An object of the invention is to overcome this difficulty by providing a coupling, which, though ordinarily permitted to swing sidewise, becomes rigid so far as lateral movement is concerned as soon as the backing operation is started. In reversible vehicles of this character, either motor trailer or horse drawn trucks or dump wagons, it is sometimes necessary to reverse the direction of travel when the forward or guiding wheels are standing out of line with the body. To accomplish this, it has been usual to throw the wheels back in line with the body and then lock the draft bar to the body by the insertion of a pin or other means through suitable apertures in the draft bar and some part connected with the vehicle body. Such an operation, particularly with a loaded vehicle, is difficult and requires considerable time, particularly if the wheels happen to be standing in loose soil.

A further object of the invention is to provide means, whereby, when such an operation is necessary, the draft bar of the unalined wheels may be automatically locked with the vehicle body by the simple operation of throwing the locking device into the locked position, unlocking the draft bar at the opposite end of the vehicle, attaching the motive power to that end, and then drawing the vehicle in what will then become the forward direction, which will cause the unalined wheels, at what will then be the rear of the vehicle, to swing about until their draft bar centers itself with the vehicle body, at which time it will become automatically locked thereto.

In the accompanying drawings: Figure 1 is a front elevation of so much of the frame of the truck as is necessary to illustrate the improvement, together with a portion of the draft-bar, showing the improvements applied thereto. Fig. 2 is a longitudinal section through a portion of the frame, the draft-bar and the locking devices for the draft-bar. Fig. 3 is a longitudinal section through two adjacent coupling heads. Fig. 4 is a similar view showing the parts in different positions.

Like parts are represented by similar characters of reference in the several views.

The truck to which these improvements relate is constructed exactly alike at each end and in the drawings, therefore, there is illustrated but one end of the truck.

In the said drawings, 1 represents one of the side portions of the frame, preferably constructed of channel iron, and 1$^a$ and 1$^b$ two end portions spaced apart and connecting the respective side portions. The frame is shown supported upon springs 2, secured to the axle 3 in any suitable manner, although this manner of supporting the frame has no bearing upon the present improvements. The draft-bar is represented by 4 and is pivotally connected at its rear end to a transverse frame member 6 by the pivot bolt 5, this draft-bar being connected to the wheels of the truck through the medium of a transverse bifurcated member 8 and swiveled head 7 in a manner more fully described in our pending application Ser. No. 739,860, filed January 2nd, 1913. The front end of the draft-bar projects between the spaced apart frame members 1$^a$ and 1$^b$, which support and guide it in its lateral swinging movement.

One of the features of the invention relates to the manner of connecting the trucks in trains so that the couplings will permit the train to be backed. In coupling trucks together, it is necessary to allow the couplings to have a vertical swinging movement, as indicated in Fig. 4, and also a lateral movement, so that, unless provision was made for it, the couplings would buckle sidewise in backing. This difficulty has been overcome as follows: The free end of each of the draft bars is provided with a head 9, having an elongated opening 10 therein and formed with a curved outer contact face 11. Removably secured to the head and extending transversely across the same at substantially the axis of the curved outer face 11, is a pin 14 which forms the means for connecting the coupling member with said head. The coupling consists of the members 12 and 13, one for each adjacent head, which members have slotted openings 12ª, 13ª, through which the pin 14 of each head is inserted. The respective members of the coupling are connected together by a vertically-arranged pivot, 15 (shown in dotted lines) so as to permit the same to swing laterally with respect to each other; the coupling members, however, being confined more or less snugly within the walls of the opening 10 so as to prevent any lateral movement of the same with respect to the heads. The result of this construction is that as the train of trucks is backed, the coupling members 12 will fall back and come freely to rest when the rounded faces of the adjacent coupling members meet. This brings the pivotal point 15 within the walls of the head and thus locks the coupling against lateral movement, the necessary vertical swinging movement of the coupling members, however, being permitted within the confines of the upper and lower walls of the head so as to permit the members of the coupling to adjust themselves to the rise and fall of the ground, as shown in Fig. 4. By having the heads formed with the curved outer faces whose axes will be represented by the coupling pin 14, it will be seen that the line between the pin centers of opposing heads will pass through the point of contact in any position of the opposing heads, thus bringing the pivotal point 15, between the members 12 and 13, always within the walls of the head in backing position and thus lock the coupling members against lateral movement.

As shown in Fig. 1 it will be seen that the walls of the head are formed on curved lines in a vertical direction so that the space between the walls will be wider at the top and bottom than in the center. This is for the purpose of permitting a certain amount of lateral movement of the coupling in case the heads should assume the position shown in Fig. 4 when under draft or on being drawn forwardly, as it will be noticed that when the heads do assume this position the pivotal point 15 will necessarily swing between the walls of one of the heads.

The next feature to be described relates to the automatic locking of the draft bar to the frame of the vehicle. As before stated, when it is desired to reverse the wagon, it is necessary to lock the draft bar, at what will become the rear of the vehicle, to the bed. If the draft bar has been left in a position such as shown in Fig. 1, it becomes necessary to throw the same around to a central position for the purpose of locking it centrally with the frame and it is often difficult to adjust this bar properly by hand in order to bring the perforations in proper registry for the reception of the locking pin. In order to overcome this difficulty, means are provided for automatically locking the draft bar with the frame as the vehicle is drawn forward. Located in a guideway formed by the bar 16, located on the brace portion 17, or any other part of the main frame, and the offset strap 18, secured to said bar 16, is a pin 19 of any shape in cross-section. This pin 19 is impelled downwardly by a spring 20 and may be held in retracted position by a cam 21 acting upon a laterally arranged and downwardly projecting portion 19ª thereof, this cam being connected with a small shaft 22 journaled in the strap 18 and the frame member 1ª and having a crank 23 on the outside of the frame member 1ª, whereby the cam 21 may be turned to retract the pin 19 or permit it to drop under the influence of the spring. So long as the draft bar is being used for steering purposes, the pin is held in retracted position, but when it is desired to lock the draft bar with the frame and steer from the other end, the pin is allowed to drop down under the influence of the spring so that its lower end will lie in the path of a plate 24, having downwardly inclined ends 25, secured to the draft bar. As the vehicle is drawn forward and the draft bar swings around, one of these down-turned ends of the plate 24 will contact the pin 19 and force it upwardly against the tension of its spring, and as the pin rides over the plate, it will drop into a recess or aperture 26 therein and thus automatically lock the bar to the frame.

Having thus described our invention, we claim:

1. In a vehicle of the character described, a chambered head, a coupling member carried by said head, a second coupling member having a pivotal connection with said first member, the connection between said first member and head being such as to allow the pivotal connection between said members to be brought either within or without the walls of said head, for the purpose specified.

2. In a vehicle of the character described, a frame, a pivoted draft bar, a slotted head at the free end of said draft bar, a coupling member carried by said head, a second coupling member having a pivotal connection with said first member, the connection between said first member and head being such as to allow the pivotal connection between said members to be brought either within or without the walls of said head, substantially as and for the purpose specified.

3. In a vehicle of the character described, a frame, a pivoted draft bar, a slotted head at the free end of said draft bar, a transverse pin carried by said head, the outer end of said head being formed with a rounded face whose axis is represented by the pin, a coupling member carried by said head, said coupling member having a slotted opening through which said pin extends, a second coupling member having a vertical pivotal connection with said first member, the construction being such as to allow the pivotal connection between said members to be brought within the walls of said head in backing, substantially as and for the purpose specified.

4. In a vehicle of the character described, a main frame, a draft bar, a head at the free end of said draft bar having an elongated slot, a transverse pin carried by said head, a coupling member having a slot to receive said pin, a second coupling pivotally connected with the outer end of said first coupling member, the pivotal connection being such that lateral movement of said members will be permitted with respect to each other, the construction and arrangement being such that under the strain of draft said pivotal connection will be without the walls of said head, but during a backing operation said pivotal connection will be within the walls of said head, for the purpose specified.

5. In a vehicle of the character described, a vertically slotted head, said head having a rounded face, a coupling member carried by said head, a second coupling member pivotally connected with said first coupling member so as to permit said members to swing laterally with respect to each other, the connection between said first member and said head being such as to permit of a vertical swinging movement of said parts with respect to each other, the walls of said head being more widely separated at the top and bottom portions thereof than at the central portion, for the purpose specified.

6. In a vehicle of the character described, a main frame, a pivoted draft bar having a connection with the steering wheels of the vehicle, a locking device for automatically locking said draft bar to said frame in a central position only, and means for holding said locking device in inoperative position to permit said draft bar to freely swing from one side of said frame to the other.

7. In a vehicle of the character described, a main frame, a draft bar pivoted at its rear end, and means for automatically locking said draft bar to said frame in a central position, said draft bar having a connection with the steering wheels of said vehicle whereby when said draft bar is unlocked the steering of the wheels may be effected thereby.

8. In a vehicle of the character described, a main frame, a draft bar pivotally connected to said main frame at its rear end, an automatic latch for locking said draft bar to said frame near its front end in a central position with respect to said main frame, said draft bar having connections with the steering wheels of said vehicle, and means for holding said latch in inoperative position to permit said draft bar to steer said wheels.

9. In a vehicle of the character described, a main frame, a draft bar pivoted at its rear end and having a connection with the steering wheels of the vehicle, a spring-pressed pin carried by said frame together with means for retracting or releasing said pin, beveled surfaces on said draft bar to engage the under side of said pin and cause it to ride across said draft bar, said draft bar having a recess to receive said pin whereby the automatic locking of said draft bar with said frame may be permitted.

10. In a vehicle of the character described, a coupling head and a plurality of coupling members associated with said head, flexible means for connecting said coupling members together during the movement of the vehicle in one direction and additional means associated with the head for holding said coupling means rigid as to any lateral movement during the opposite movement of said vehicle for the purpose specified.

In testimony whereof, we have hereunto set our hands this 4th day of November 1913.

JOHN F. ECCARD.
JACOB SMITH.

Witnesses:
G. R. HARRIS,
JOS. H. STICKLEY.